United States Patent [19]

Kohler

[11] Patent Number: 5,721,770

[45] Date of Patent: Feb. 24, 1998

[54] AGENT VECTORING PROGRAMMABLY CONDITIONALLY ASSIGNING AGENTS TO VARIOUS TASKS INCLUDING TASKS OTHER THAN HANDLING OF WAITING CALLS

[75] Inventor: Joylee E. Kohler, Northglenn, Colo.

[73] Assignee: Lucent Technologies Inc., Murray Hill, N.J.

[21] Appl. No.: 674,477

[22] Filed: Jul. 2, 1996

[51] Int. Cl.[6] .............................. H04Q 3/64; H04M 3/42; H04M 3/00

[52] U.S. Cl. .......................... 379/266; 379/210; 379/309

[58] Field of Search ............................ 370/270; 379/265, 379/266, 309, 210, 211, 212, 214

[56] References Cited

U.S. PATENT DOCUMENTS

| | | | |
|---|---|---|---|
| 5,206,903 | 4/1993 | Kohler et al. | 379/309 |
| 5,335,269 | 8/1994 | Steinlicht | 379/266 |
| 5,467,391 | 11/1995 | Donaghue, Jr. et al. | 379/265 |
| 5,499,291 | 3/1996 | Kepley | 379/265 |
| 5,506,898 | 4/1996 | Costantini et al. | 379/266 |

OTHER PUBLICATIONS

U. S. Patent Application, A. D. Flockhart 3-4, Serial No. 08/552642, "Arrangement for Queuing a Call to the Best Spit", Filed Nov. 3, 1995.

Definity[R] Communications System Generic 3 Call Vectoring/ Expert Agent Selection (EAS) Guide, 555-230-520, Issue 3, Nov. 1993, pp.1-1—1-10; 2-1—2-22; 3-1—3-15; 8-1—8-24.

Primary Examiner—Harry S. Hong
Attorney, Agent, or Firm—David Volejnicek

[57] ABSTRACT

An ACD system (101) is programmable by an operator of the ACD system to automatically change the work of a call center agent (106–108) in order to maximize the agent's productivity and to provide a variety of work balanced with "breather" time in order to prevent agent burn-out. The conditions for changing the agent's work and the agent's alternative duties when the conditions are met are both programmed by the operator via a vectoring capability (150) of the ACD system and a scripting language (FIGS. 2–23) for defining the vectors. When an agent becomes available to handle a call from a particular call queue (121–129), the agent's corresponding vector is executed, and the conditions specified by the vector are checked against the present status of the call center to determine if they are met. If the conditions are not met, the agent is caused to handle a call from the particular call queue. But if the conditions are met, the agent is caused to perform a function specified by the vector, other than handing a call from the particular call queue, even though a call may be waiting for an available agent in that call queue.

16 Claims, 12 Drawing Sheets

AGENT VECTORING PROGRAMMABLY CONDITIONALLY ASSIGNING AGENTS TO VARIOUS TASKS INCLUDING TASKS OTHER THAN HANDLING OF WAITING CALLS

TECHNICAL FIELD

This invention relates to automatic call distribution (ACD) systems, also variously referred to as call centers or telemarketing systems.

BACKGROUND OF THE INVENTION

ACD systems distribute calls—whether inbound or outbound—for handling to any suitable ones of available call-handling agents according to some predefined criteria. In many existing systems, such as the Lucent Technologies Definity® ACD system, the criteria for handling the call from the moment that the ACD system becomes aware of the call until the call is connected to an agent are customer-specifiable (i.e., programmable by the operator of the ACD system) via a capability called call vectoring. Normally in present-day ACD systems, when the ACD system's controller detects that an agent has become available to handle a call, the controller identifies all predefined call-handling skills of the agent (usually in some order of priority) and delivers to the agent the highest-priority oldest-waiting call that matches the agent's highest-priority skill. Generally the only condition that results in a call not being delivered to an available agent is that there are no calls waiting to be handled.

Agents' skill priorities do not change based on existing call conditions. Consequently, it is common for an agent to get a higher-priority call that has just arrived even if another call that the agent has the skill to handle has been waiting, and to keep getting calls of that higher-priority one after another for as long as they are available. This can contribute to a great disparity of waiting times between calls requiring different agent skills. It also contributes to agent burn-out caused by a lack of variety of calls handled by the agent.

Present-day call-center-management tools enable a call-center supervisor to monitor the call center, decide what each agent should be doing, and change the system accordingly. However, the supervisor normally must effect the change manually, or even by requesting the agent to itself effect the change by changing its work modes. This is a time-consuming and inefficient procedure.

SUMMARY OF THE INVENTION

This invention is directed to solving these and other problems and disadvantages of the prior art. Illustratively according to the invention, there is provided a method and an apparatus that automatically changes a call center agent's work in order to maximize the agent's productivity and to provide a variety of work balanced with "breather" time in order to prevent agent burn-out. The conditions for changing the agent's work and the agent's alternative duties are operator-programmable via a vectoring capability and a scripting language for defining the vectors.

Generally according to the invention, an operator of a call center is enabled to programmably specify any one of a plurality of conditions that is selected by the operator. Then in response to an agent becoming available to handle a call while a call is waiting to be handled by an available agent, a determination is made of whether a present state of the call center satisfies the condition that has been programmably specified by the operator. In response to a determination that the condition is one of (a) satisfied and (b) not satisfied, the available agent is caused to handle the waiting call. But in response to a determination that the condition is the other of (a) satisfied and (b) not satisfied, the available agent is caused to perform a function other than handling the waiting call—taking a breather from handling calls, for example. Preferably, the operator programmably specifies not only the condition but also the function that is the agent's alternative to handling the waiting call, and preferably the operator programmably specifies the condition and the function individually for each agent. Preferably, the specification is performed by means of an agent vector for each agent, which vector is executed when the corresponding agent becomes available to handle a call. The agent vector may comprise a plurality of vector steps each specifying a different condition and function and also specifying—either explicitly or implicitly—whether, and which, other vector step or steps are to be executed if the condition specified by the presently-executing step is not satisfied, and the function specified by the presently-executing vector step is assigned to the agent if the condition specified by the presently-executing vector step is satisfied.

Consequently, an agent who becomes available to handle a call is automatically assigned work whose selection is based upon the present state of the call center (which state may include either the call center's or the agent's own present history) and not just upon whether or not a call is waiting for the agent. Moreover, the selection of the work is programmable by an operator of the call center rather than being fixed, and hence is flexible and adaptable to each operator's needs.

Illustratively, the invention may be used to implement the following advantageous scenarios:

Depending on the call queue conditions or the agent's occupancy rates, agents can be given a variable-length breather between answering calls (e.g., by being placed in "after call work" state, ACW) or they can be automatically put in "AUXiliary" work state with reason code (e.g., "doing mail"), either for a timed period or in a "wait for agent action" mode. Agents can also be given music during this time away from calls.

Agents can backup other skills only if the call queues are in trouble or during certain times of day. Today, supervisors and others who backup agents have to monitor the call queues and log in when traffic spikes occur. With agent vectoring, this can be done automatically by creating agent vectors that only assign agents to handle calls when call queues reach a certain occupancy level and stop automatically when queues fall below that occupancy level.

Breaks can be automatically programmed in the agent vector based on the time-of-day and number of agents presently on break.

Agents can control how much time they spend on a particular skill by setting a ceiling on the number of calls they handle or the amount of time they will spend on handling calls. Agents can dedicate a percentage of their time to each of their skills. This can also be used to force a variety of calls to be sent to an agent.

Employee work-time scheduling packages can do a better job of scheduling agents with multiple skills by dedicating a percentage of the agents' time to each of their skills.

Agents' preferences may be determined and given effect by the ordering of vector command steps, not merely by the agents' level of expertise.

Announcements and tones can be played to agents (e.g., "take a break", "overload", "back to work") based on what is happening in the call center.

Vectors can be chained together by using a "goto agent vector" command for continued vector processing, or agents can be removed from a vector's processing by using a "route to agent vector" command to interrupt the present vector processing.

Special "execute once" vectors can be used by service observers to give agents immediate feedback. For example, if an agent did a good job, an announcement could be played to the agent congratulating the agent, followed by a break. But if the agent did a poor job, the agent could be routed to the observer for immediate consultation.

These and other advantages and features of the present invention will become more apparent from the following description of an illustrative embodiment of the invention taken together with the drawing.

DETAILED DESCRIPTION

Figure 1:
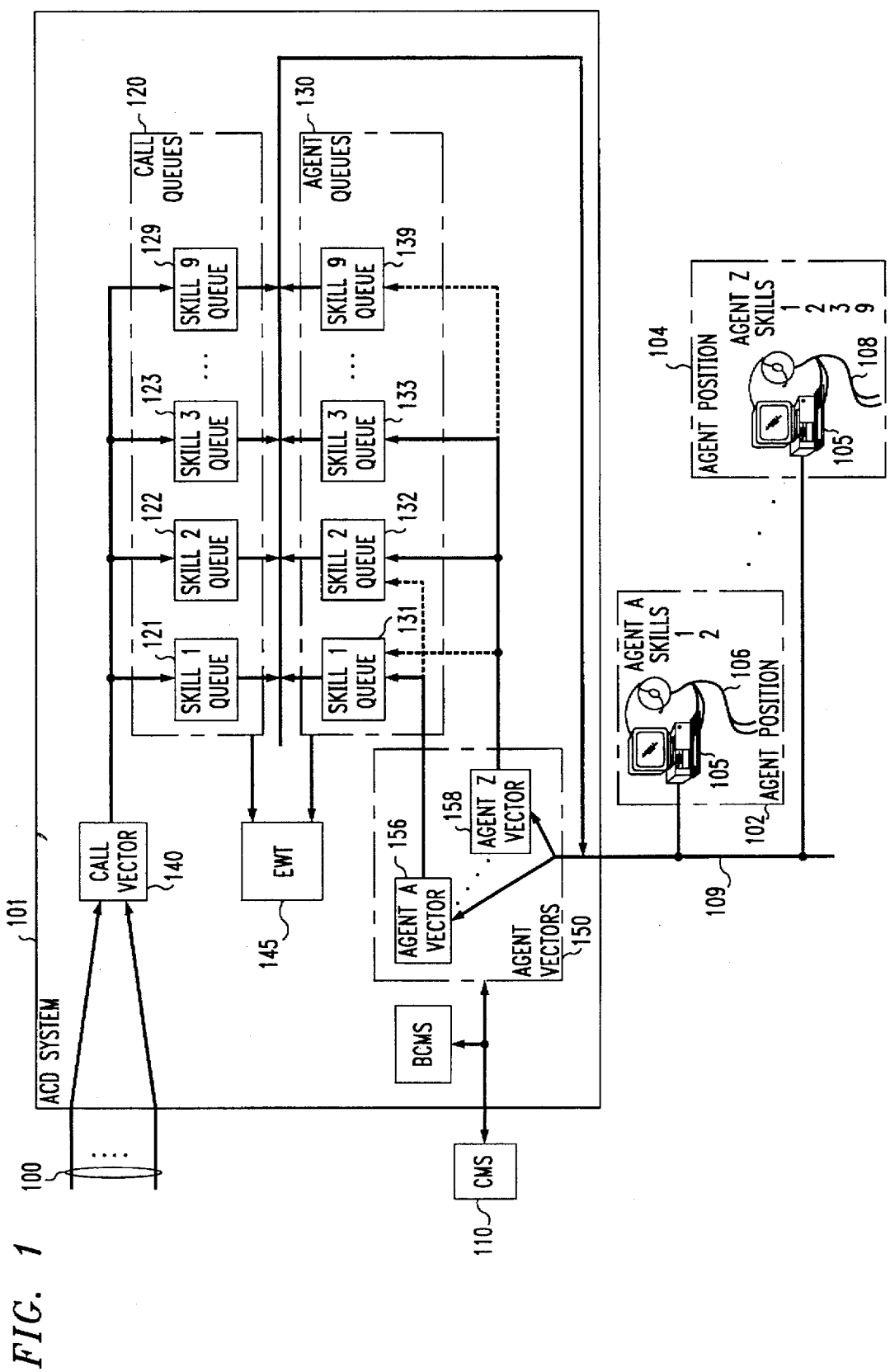
FIG. 1 is a block diagram of a call center that includes an illustrative embodiment of the invention.

FIG. 1 shows an illustrative call center. As is conventional, the call center comprises a plurality of telephone lines and/or trunks 100 selectively interconnected with a plurality of agent positions 102–104 via an ACD system 101. Each agent position 102–104 includes a voice-and-data terminal 105 for use by a corresponding agent 106–108 in handling calls. Terminals 105 are connected to ACD system 101 by a voice-and-data transmission medium 109. Also, included in ACD system 101 is a conventional basic call management system (BCMS) and connected to ACD system 101 is a conventional call management system (CMS) 110 that gather call records and call-center statistics for use in managing the call center and in generating call-center reports. CMS and BCMS will hereafter be referred to jointly as CMS 110.

ACD system 101 is illustratively the Lucent Technologies Definity® private-branch exchange (PBX)-based ACD system. It is a stored-program-controlled system that conventionally includes interfaces to external communications links, a communications switching fabric, service circuits (e.g., tone generators, announcement circuits, etc.), memory for storing control programs and data, and a processor for executing the stored control programs to control the interfaces and the fabric and to provide automatic call-distribution functionality. Included among the data stored in ACD system 101 are a set of call queues 120 and a set of agent queues 130. Each call queue 121–129 corresponds to a different agent skill, as does each agent queue 131–139. Conventionally, calls are prioritized, and either are enqueued in individual ones of call queues 120 in their order of priority or are enqueued in different ones of a plurality of call queues that correspond to a skill and each one of which corresponds to a different priority. Likewise, each agent's skills are prioritized according to his or her level of expertise in that skill, and either agents are enqueued in individual ones of agent queues 130 in their order of expertise level or are enqueued in different ones of a plurality of agent queues that correspond to a skill and each one of which corresponds to a different expertise level. Included among the control programs in ACD system 101 are a call vector 140, and a function for estimating in-queue waiting time (EWT) 145. Calls incoming to the call center on lines or trunks 100 are assigned by call vector 140 to different call queues 121–129 based upon the agent skill that they require for their proper handling. A call may require more than one skill, and hence may be assigned to multiple call queues 121–129 simultaneously, typically at different priorities. EWT 145 computes estimates of how long an incoming call will have to wait in a call queue 121–129, e.g., before being handled by an agent. Agents 106–108 who are available for handling calls are assigned to agent queues 131–139 based upon the skills which they possess. An agent may have multiple skills, and hence may be assigned to multiple agent queues 131–139 simultaneously. Furthermore, an agent may have different levels of skill expertise (e.g., skill levels 1–16 in one known system or merely primary (P) skills and secondary (S) skills in another known system), and hence may be assigned to different agent queues 131–139 at different expertise levels. Call vectoring is described in DEFINITY® Communications System Generic 3 Call Vectoring/Expert Agent Selection (EAS) Guide, AT&T publication no. 555-230-520 (Issue 3, Nov. 1993). Skills-based ACD is described in further detail in U.S. Pat. No. 5,206,903. An illustrative EWT function is described in U.S. Pat No. 5,506,898.

Conventionally, an agent 106–108 is assigned to one or more agent queues 131–139 unconditionally upon becoming available to handle a call, is assigned to each agent queue 131–139 that corresponds to one of the agent's skills, and is assigned to each such agent queue at a priority that corresponds to the agent's level of expertise in the corresponding skill. According to the invention, however, agent assignment to agent queues 131–139 is made conditional, based on the call-center's real-time conditions defined by the operator of the call center (also often referred to as the administrator or the supervisor or the owner of the call center, or the customer). For this purpose, the control programs of ACD system 101 include agent vectors 150, with at least one agent vector 156–158 for each agent 106–108, respectively. Agent vectors 150 and other control programs associated therewith (e.g., vector programming support facilities) may be stored either in an internal memory of system 101 or in an external storage device (e.g., a disk, a CD-ROM, etc.). Each agent vector 156–158 is a script, a program, that is executed when the corresponding agent 106–108 becomes free to handle a call (e.g., conventionally when the state of the corresponding agent 106–108 becomes "available"). Further according to the invention, a scripting language is provided for composing agent vectors 156–158. The commands and conditions that make up an illustrative example of the scripting language are diagramed in FIGS. 2–12 and 13–23, respectively, and are described below.

Figure 2:
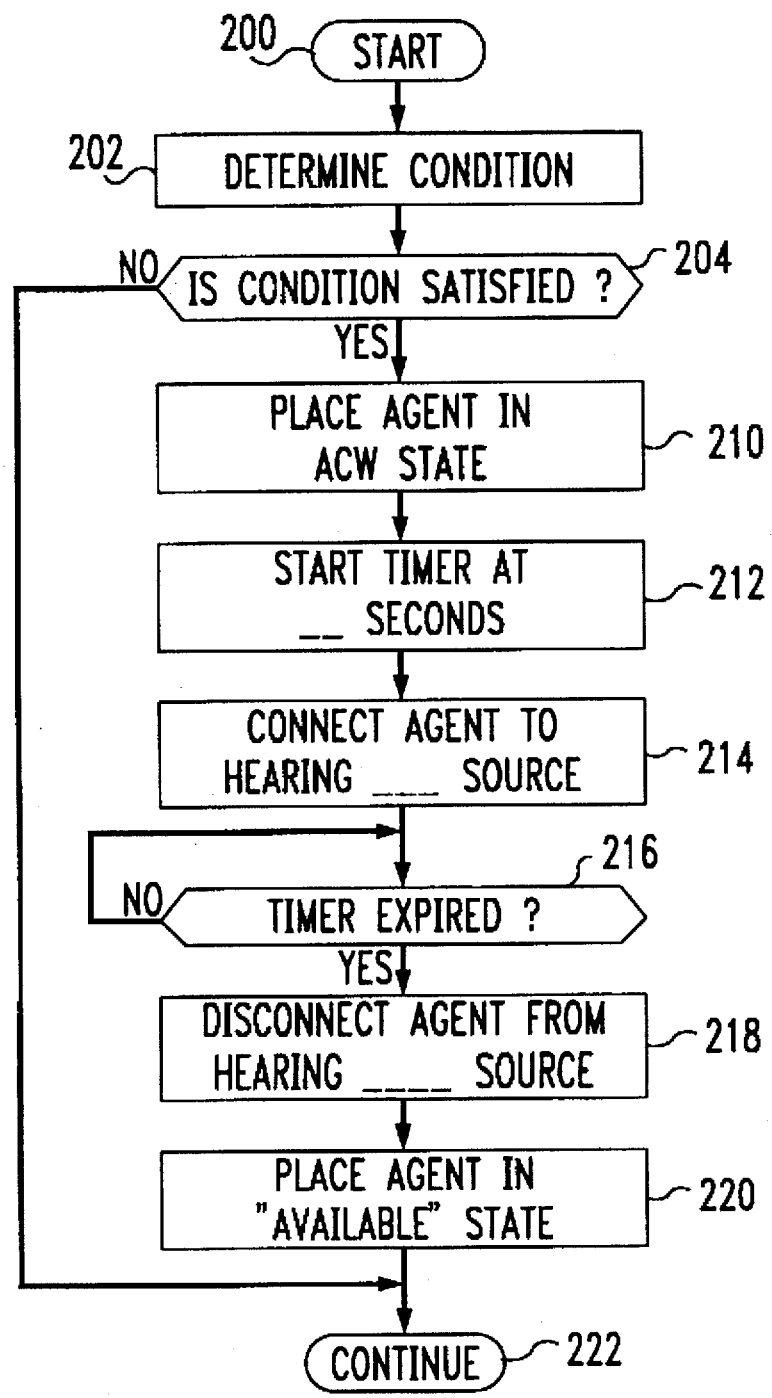
FIGS. 2–12 are functional flow diagrams of illustrative commands that are used to implement agent vectors of the ACD system of the call center of FIG. 1.

"Wait_seconds hearing_in ACW if_" command of FIG. 2 gives the agent a "breather" from handling calls for the specified time if the specified condition is satisfied. The command's parameters are: number of seconds; audio-program source number; and a condition. Upon encountering this command in an agent vector, at step 200, ACD system 101 determines (computes) the specified condition, at step 202, and if the condition has not been satisfied, as determined at step 204, system 101 continues on to a next command of the agent vector, at step 222. If it is determined at step 204 that the specified condition has been satisfied, system 101 proceeds to steps 210 et seq. to give the agent a "breather". At step 210, system 101 places the agent in the "after-call work" (ACW) state, to prevent the agent from receiving another call. It then connects the agent's audio to the audio source specified by the command's "hearing_" parameter, at step 212. This may be, for example, an announcement, or music, or silence. System 101 also starts a timer to time the "breather" time period whose length is specified by the command's "_seconds" parameter, at step 214. System 101 then waits for this time period to expire, at step 216. Upon expiration of the "breather" time period, system 101 disconnects the agent from the audio source of step 212, at step 218, and places the agent back in the "available" state, at step 220. System 101 then continues on to a next command of the agent vector, at step 222.

Figure 3:
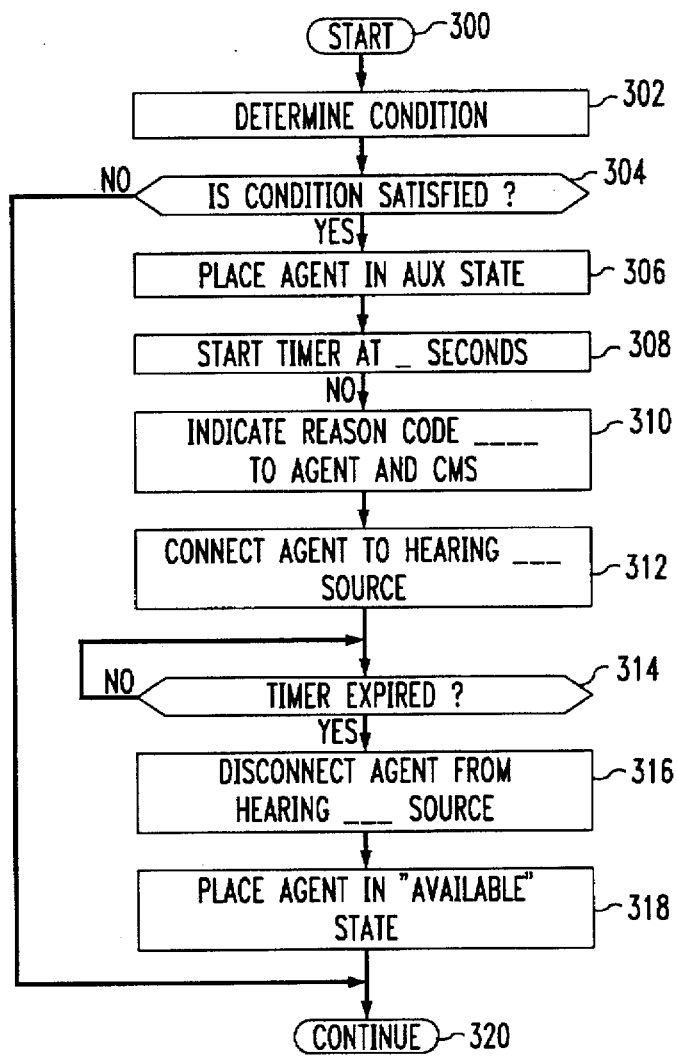

"Wait_seconds hearing_in AUX reason code_if_" command of FIG. 3 gives the agent a "breather" or, when used together with a "goto" command, changes the type of work given to the agent, for up to the indicated time if the specified condition is satisfied. The command's parameters are: number of seconds; audio-program source number; a reason code; and a condition. Upon encountering this command in an agent vector, at step 300, ACD system 101 determines the specified condition, at step 302, and if the condition has not been satisfied, as determined at step 304, system 101 continues on to a next command of the agent vector, at step 320. If it is determined at step 304 that the specified condition has been satisfied, system 101 places the agent in auxiliary work (AUX) state, at step 306, to prevent the agent from receiving another call. It then starts a timer to time the "breather" or alternate-work time period whose length is specified by the command's "_seconds" parameter, at step 308. During this time period, the agent does not receive ACD calls. System 101 also indicates the code specified by the command's "reason code_" parameter to the agent and to CMS 110, at step 310. System 101 then also connects the agent's audio to the audio source specified by the command's "hearing_" parameter, at step 312. This may be a null source, i.e., silence. System 101 then waits for this time period to expire, at step 314. Upon expiration of this time period, system 101 disconnects the agent from the audio source of step 312, at step 316, and places the agent back in the "available" state, at step 318. System 101 then continues on to a next command of the agent vector, at step 320.

Figure 4:
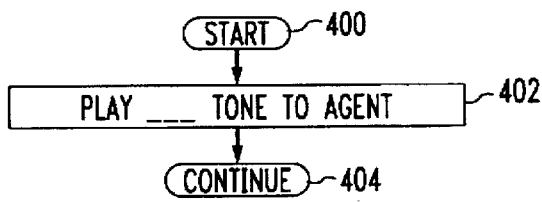

"Play_tone" command of FIG. 4 plays a specified tone to the agent in order to get the agent's attention. The command's parameter is a tone identifier. (For example, if the EWT of a call queue being served by the agent exceeds some predetermined time, an urgency tone may be played to the agent to alert the agent that he or she needs to be unusually efficient in handling calls.) Upon encountering this command in an agent vector, at step 400, system 101 briefly plays the tone specified by the "_tone" parameter to the agent, at step 402. System 101 then continues on to a next command of the agent vector, at step 404.

Figure 5:
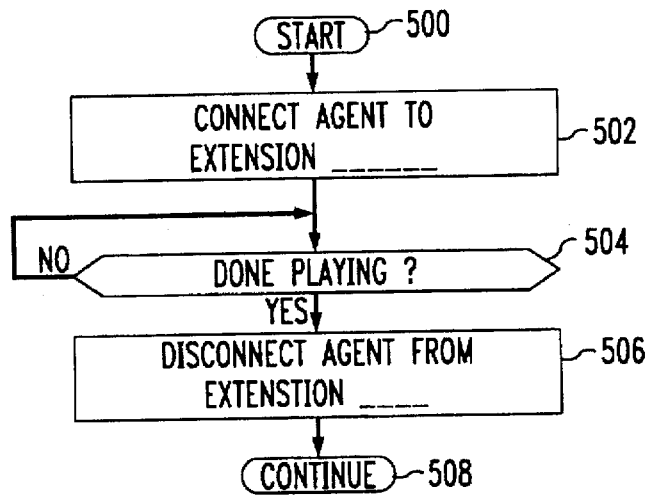

"Announcement extension_" command of FIG. 5 plays the specified announcement to the agent. The command parameter is an announcement identifier. Upon encountering this command in an agent vector, at step 500, system 101 connects the agent's audio to the indicated announcement, at step 502. When the announcement is done playing, as determined at step 504, system 101 disconnects the agent's audio from the announcement, at step 506, and continues on to a next command of the agent vector, at step 508.

Figure 6:
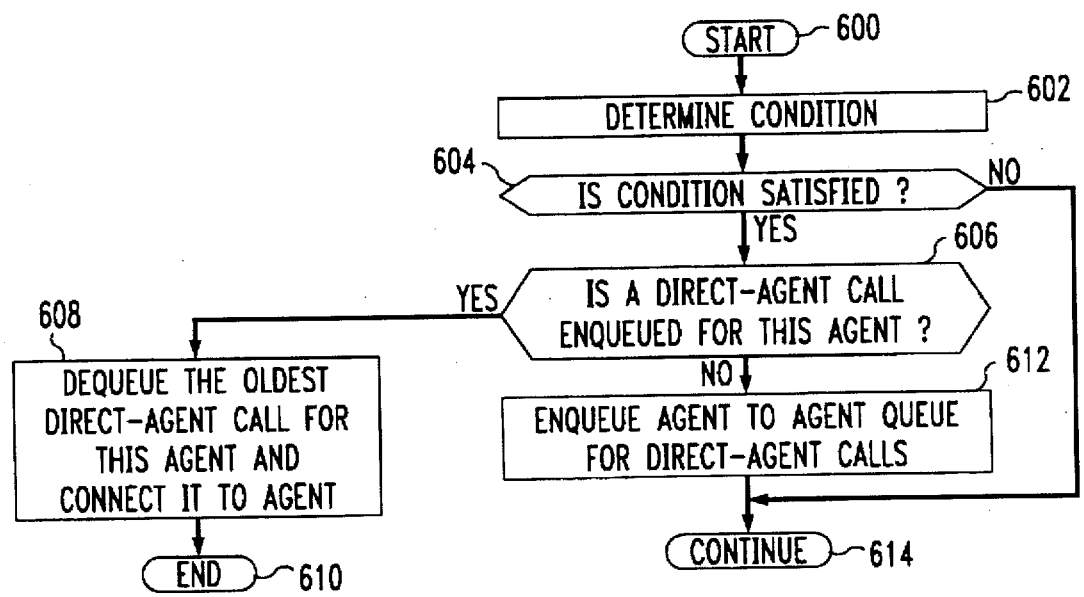

"Take direct agent call if_" command of FIG. 6 connects the agent to any call that was placed directly to the agent's own telephone number (as opposed to the ACD telephone number) if the specified condition is satisfied. The command's parameter is: an indication of a condition that must be satisfied for the command to be executed. Upon encountering the command in an agent vector, at step 600, system 101 determines the condition, at step 602, and if the condition is not satisfied, as determined at step 604, system 101 continues on to a next command of the agent vector, at step 614. If it is determined at step 604 that the condition is satisfied, system 101 checks whether there is a direct-agent call enqueued for this agent, at step 606. (Direct-agent calls are treated by ACD system 101 like ACD calls, but are assigned to, and queued at, the highest priority level.) If a direct-agent call is enqueued for this agent, system 101 dequeues the oldest direct-agent call for this agent and connects it to the agent, at step 608. System 101 then ends processing of this agent vector, at step 610. If it is determined at step 606 that a direct-agent call for this agent is not enqueued, system 101 assigns the agent to the direct-agent (highest-priority) queue 131–139, at step 612, to await the arrival of a direct-agent call for this agent. System 101 then continues on to a next command of the agent vector, at step 614.

Figure 7:
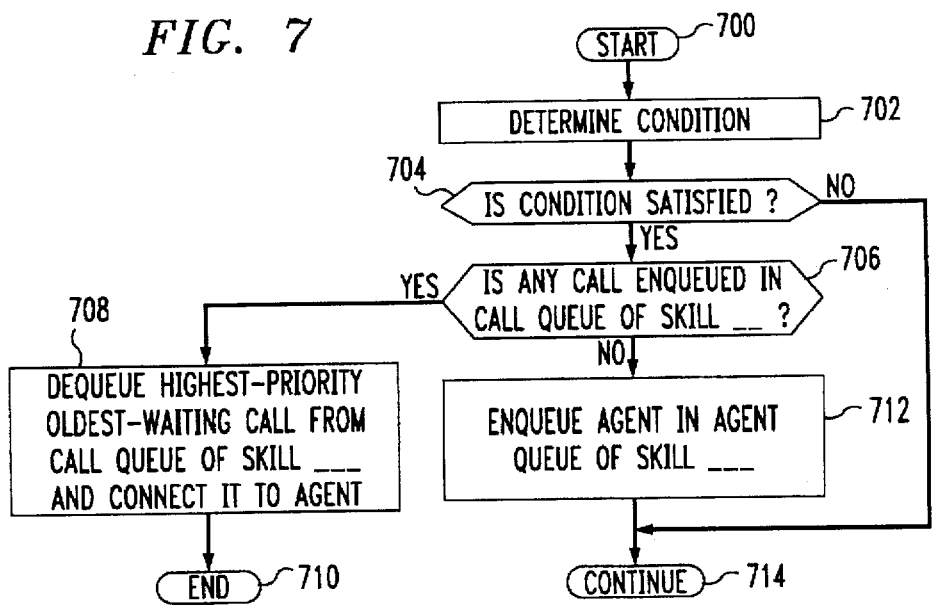

"Take call from skill_expertise level_if_" command of FIG. 7 places the agent in the agent queue associated with the specified skill and expertise level if the specified condition is satisfied. The command's parameters are: a skill number; an expertise-level number; and a condition that must be satisfied for the command to be executed. Upon encountering the command in an agent vector, at step 700, system 101 determines the condition, at step 702, and if the condition is not satisfied, as determined at step 704, system 101 continues on to a next command of the agent vector, at step 714. If it is determined at step 704 that the condition is satisfied, system 101 checks whether the call queue that corresponds to the skill specified by the command's "skill_" parameter has an enqueued call, at step 706. If so, system 101 dequeues the highest-priority oldest-waiting call from that call queue and connects it to the agent, at step 708. System 101 then ends processing of this agent vector, at step 710. If it is determined at step 706 that a call is not enqueued in the call queue specified by the command's "skill_" parameter, system 101 enqueues the agent in the agent queue 131–139 which corresponds to the skill specified by the command's "skill_" parameter, at step 712, to await the arrival of a call needing that skill. System 101 then continues on to the next command of the agent vector, at step 714.

Figure 8:
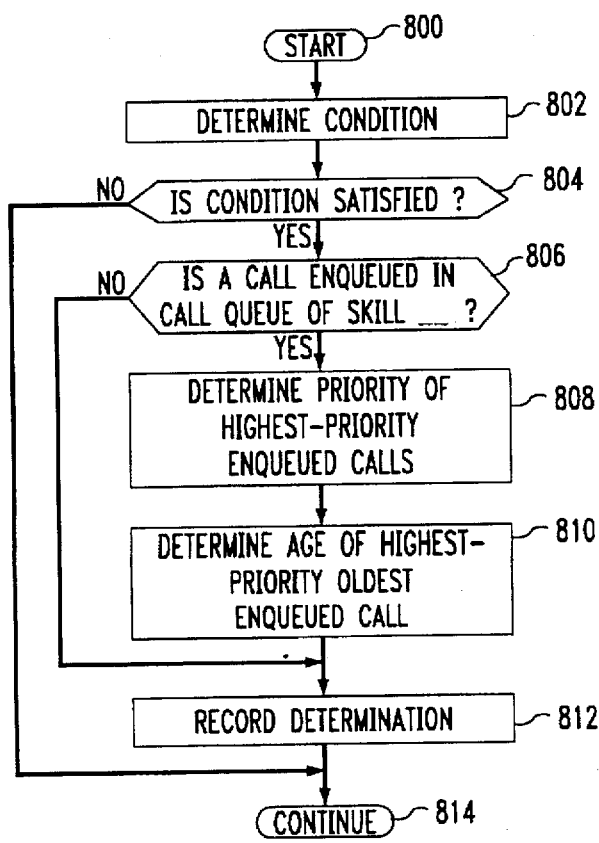
Figure 9:
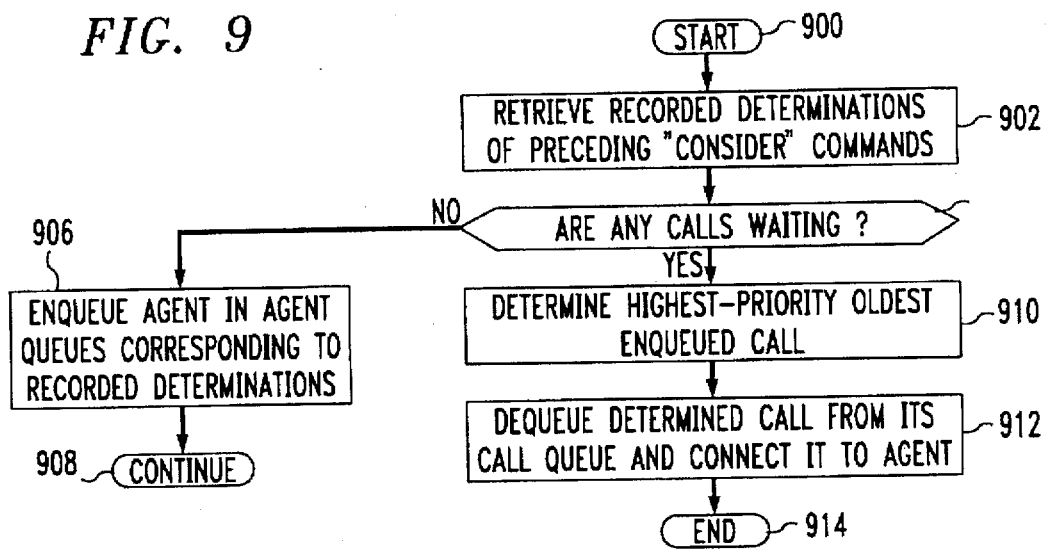

"Consider skill_expertise level_if_" and "Take call from all considered" are commands that effectively function as one command. Their functionality is shown in FIGS. 8 and 9, respectively. These commands connect the agent to the call with the greatest need from all considered call queues. Typically, there will be two or more "consider" commands in sequence in an agent vector, followed by the "take call" command. The "consider" commands function as specifiers of call queues for the "take call" command, which functions as the operator. The parameters of the "consider" command are: a skill number; an expertise-level number; and a condition.

Upon encountering the "consider" command in an agent vector, at step 800, system 101 determines the condition, at step 802, and if the condition is not satisfied, as determined at step 804, system 101 continues on to a next command of the agent vector, at step 814. If it is determined at step 804 that the condition is satisfied, system 101 checks whether there is a call enqueued in the call queue that corresponds to the skill specified by the command's "skill__" parameter, at step 806. If not, system 101 records this determination, at step 812; if so, system 101 determines the priority of the highest-priority calls that are enqueued in that call queue., at step 808, and then determines the age of the oldest one of those highest-priority enqueued calls, at step 810. System 101 then records this determination, at step 812. Following step 812, system 101 continues on to a next command of the agent vector, at step 814.

Upon encountering the "take call from all considered" command in an agent vector, at step 900, system 101 retrieves the recorded determination of all immediately-preceding "consider" commands, at step 902, and determines therefrom whether there are any calls waitingcommand's condieues for which the "consider" command's conditions were satisfied, at step 904. If there are no waiting calls, system 101 enqueues the agent in the agent queues that correspond to the call queues of step 904, at step 906, and then continues on to a next command of the agent vector, at step 908. If it is determined at step 904 that there are waiting calls, system 101 determines from the recorded determinations the highest-priority oldest enqueued call, at step 910. System 101 then dequeues this call from its call queue and connects it to the agent, at step 912, and then ends processing of this agent vector, at step 914.

Figure 10:
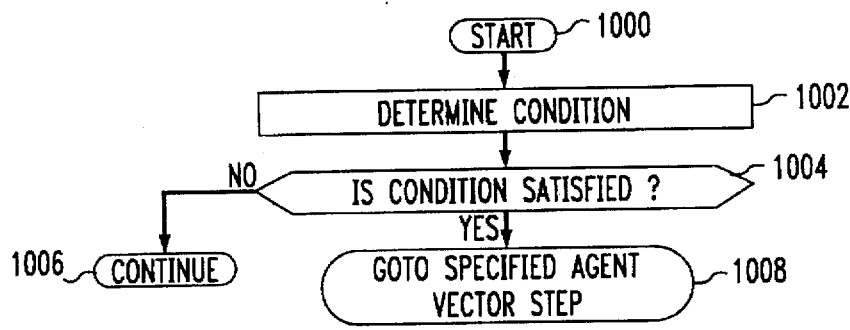

"Goto step__if__" command of FIG. 10 redirects agent-vector execution to a specified step in the agent vector if the specified condition is satisfied. The command's parameters are: an identifier of a particular step (command) in the agent vector; and a condition that must be satisfied for the command to be executed. Upon encountering the command in an agent vector, at step 1000, system 101 determines the specified condition, at step 1002, and if the condition is not satisfied, as determined at step 1004, system 101 continues on to a next command of the agent vector, at step 1006. If it is determined at step 1004 that the specified condition is satisfied, system 101 continues execution of the agent vector at the vector step specified by the "step__" parameter, at step 1008.

Figure 11:
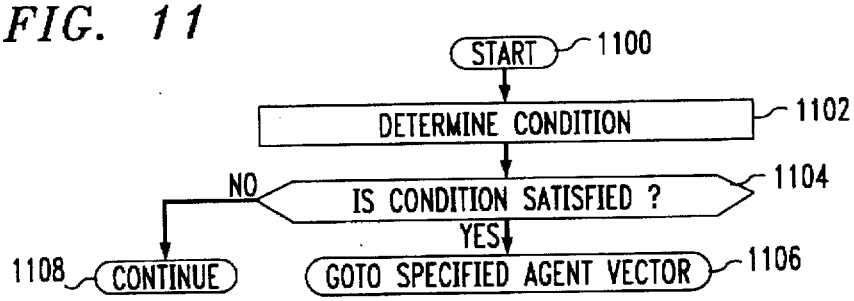

"Goto agent vector__if__" command of FIG. 11 redirects. vector execution to the specified agent vector if the specified condition is satisfied. The command's parameters are: an identifier of an agent vector; and a condition. Upon encountering this command in an agent vector, at step 1100, system 101 determines (computes) the specified condition, at step 1102, and checks whether the specified condition is satisfied, at step 1104. If not, system 101 merely continues on to a next command of the agent vector, at step 1106; if so, system 101 ceases execution of the agent vector that it is presently executing and commences execution of the agent vector specified by the "agent vector__" parameter, at step 1108. The agent remains enqueued in any agent queues in which he or she has been enqueued.

Figure 12:
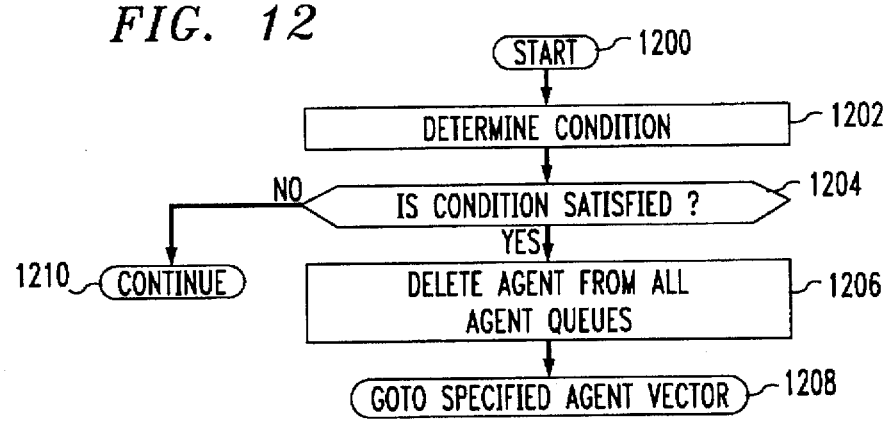

"Route to agent vector__if__" command of FIG. 12 deletes the agent from agent queues 130 and redirects vector execution to a specified agent vector if a specified condition is satisfied. The command's parameters are: an identifier of an agent vector; and a condition. Upon encountering this command in an agent vector, at step 1200, system 101 determines (computes) the specified condition, at step 1202, and checks whether the specified condition is satisfied, at step 1204. If not, system 101 merely continues on to a next command of the agent vector, at step 1210; if so, system 101 deletes the agent from all agent queues 131–139, at step 1206, and then ceases execution of the agent vector that it is presently executing and commences execution of the agent vector specified by the "agent vector__" parameter, at step 1208.

Figure 13:
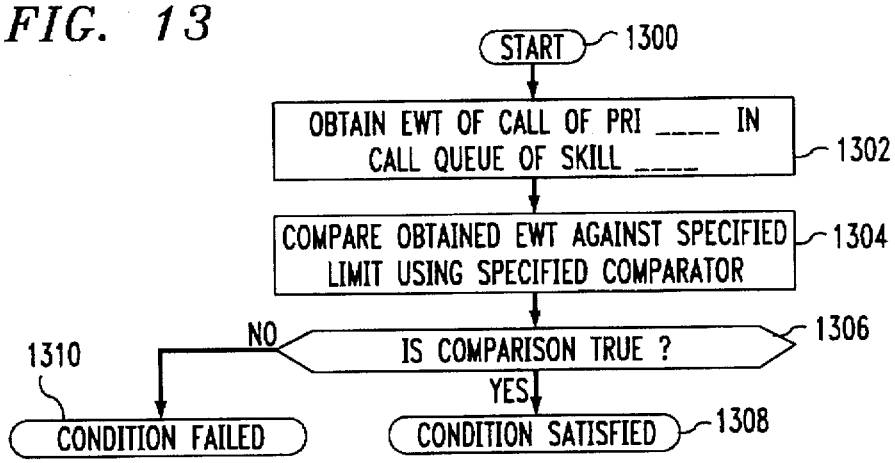
FIGS. 13–23 are functional flow diagrams of illustrative conditions that are used to implement the agent vectors of the ACD system of the call center of FIG. 1.

"If new call skill__pri__ewt(comp)__" condition of FIG. 13 tests if the expected in-queue waiting time of a new call just entering a specified call queue meets a specified time limit. The condition's parameters are: a skill number; a skill priority number; a comparator (comp); and an estimated in-queue waiting time limit. Allowed comparators are "less than", "greater than", "less than or equal to", "greater than or equal to", "equal to", and "not equal to". Upon encountering this condition in a vector command, at step 1300, ACD system 101 obtains the EWT for a call of priority "pri__" in call queue of "skill__" from EWT function 145, at step 1302, and compares the obtained EWT against the specified limit by using the specified comparator, at step 1304. If the comparison is true, as determined at step 1306, the condition has been satisfied, as indicated at step 1308; if the comparison is false, the condition has failed, as indicated at step 1310.

Figure 14:
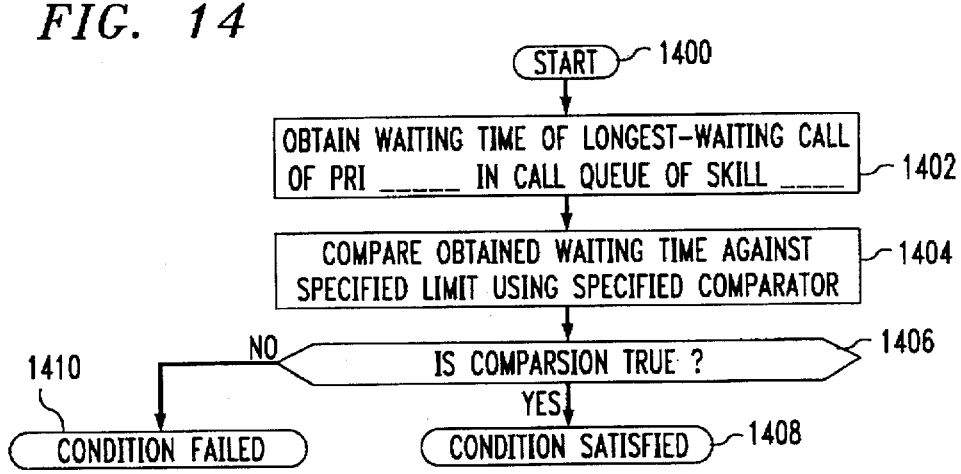

"If oldest call waiting skill__pri__(comp)__" condition of FIG. 14 tests if the oldest presently-waiting call of the specified priority in a specified call queue meets a specified time limit. The condition's parameters are: a skill number; a skill priority number; a comparator (comp); and a time limit. Upon encountering this condition in a vector command, at step 1400, ACD system 101 determines the waiting time of the oldest call of priority "pri__" waiting in call queue of "skill__", at step 1402, and compares the waiting time against the specified time limit by using the specified comparator, at step 1404. If the comparison is true, as determined at step 1406, the condition has been satisfied, as indicated at step 1408; if the comparison is false, the condition has failed, as indicated at step 1410.

Figure 15:
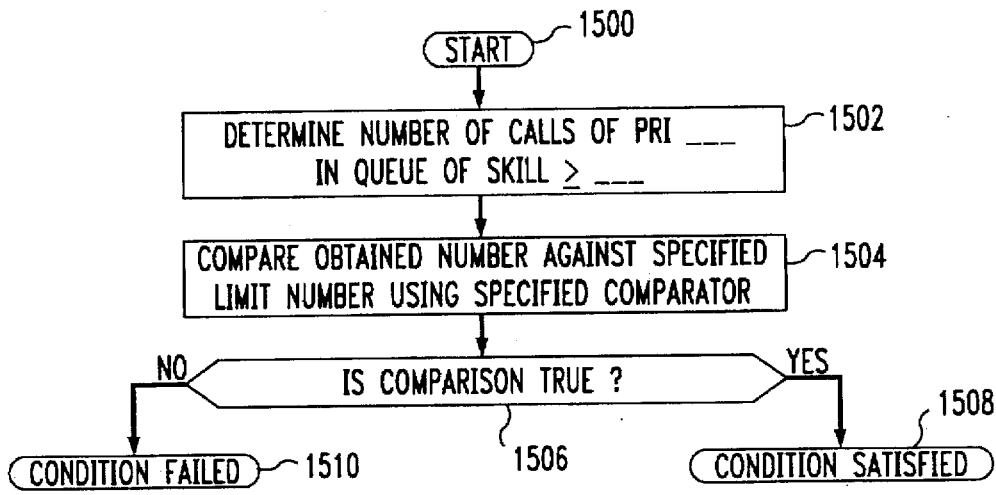

"If calls queued skill__pri__(comp)__" condition of FIG. 15 tests if the number of presently-waiting calls of the specified or a higher priority in a specified call queue meets a specified limit. The condition's parameters are: a skill number; a priority number; a comparator (comp); and a limit number. Upon encountering this condition in a vector command, at step 1500, ACD system 101 determines the number of calls of priority "pri__" that are in call queue of "skill__", at step 1502, and compares this number against the specified limit number by using the specified comparator, at step 1504. If the comparison is true, as determined at step 1506, the condition has been satisfied, as indicated at step 1508; if the comparison is false, the condition has failed, as indicated at step 1510.

Figure 16:
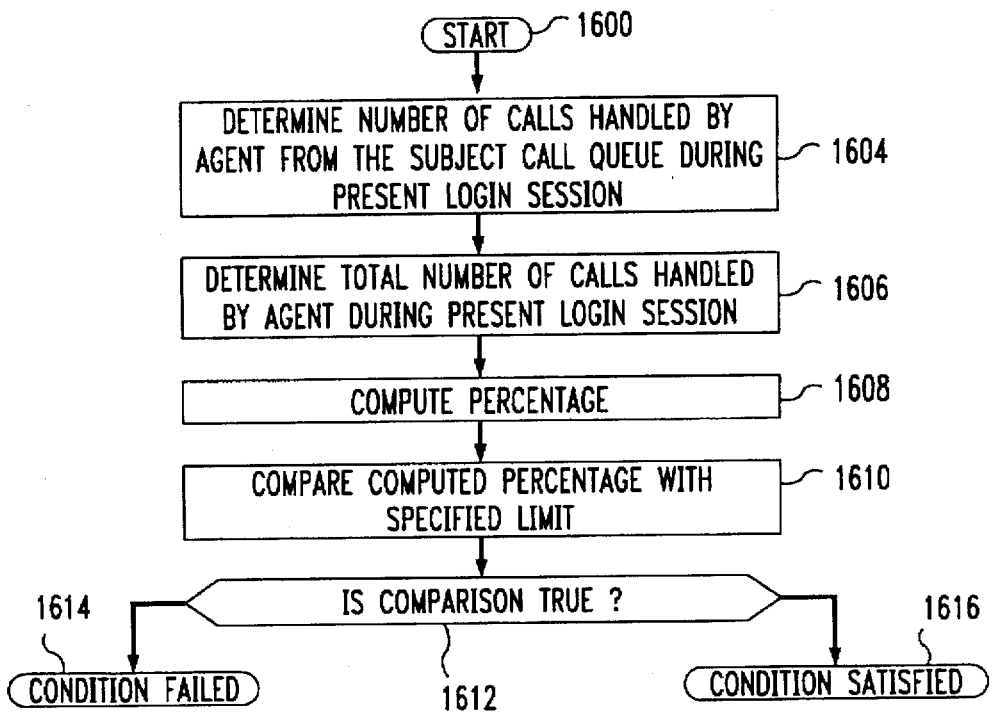

"If my % calls for this skill(comp)__" condition of FIG. 16 tests if calls handled from the call queue specified by this condition's accompanying command constitute a specified percentage of all calls handled by the agent. The condition's parameters are: a comparator (comp) such as =, $\geq$, or $\leq$; and a percentage limit. Upon encountering this condition in a vector command, at step 1600, ACD system 101 obtains from CMS 110 the number of calls from the subject call queue handled by the agent during the agent's present login session, at step 1604, and the total number of calls handled by the agent during the agent's present login session, at step 1606. System 101 then computes therefrom the percentage of all calls handled by the agent that are from the subject call queue, at step 1608, and compares the computed percentage against the specified limit by using the specified comparator, at step 1610. If the comparison is true, as determined at step 1612, the condition has been satisfied, as indicated at step 1616; if the comparison is false, the condition has failed, as indicated at step 1614.

Figure 17:
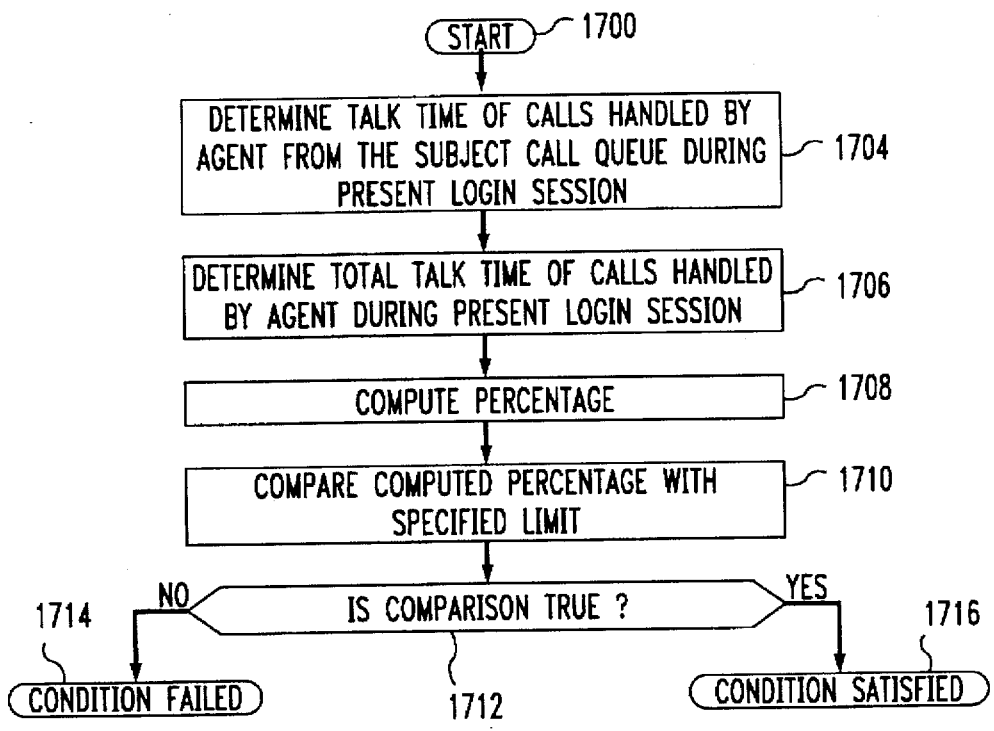

"If my % talk time for this skill(comp)__" condition of FIG. 17 tests if the agent's talk time (time actually connected to a call) on calls from the call queue specified by this condition's accompanying command constitutes a specified percentage of the agent's total talk time. The condition's parameters are: a comparator (comp) =,≧, or ≦; and a percentage limit. Upon encountering this condition in a vector command, at step 1700, system 101 obtains from CMS 110 the talk time of calls from the subject queue handled by the agent during the agent's present login session, at step 1704, and the total talk time of all calls handled by the agent during the agent's present login session, at step 1706. System 101 then computes therefrom the percentage of total talk time spent by the agent on calls from the subject call queue, at step 1708, and compares the computed percentage against the specified limit by using the specified comparator, at step 1710. If the comparison is true, as determined at step 1712, the condition has been satisfied, as indicated at step 1716; if the comparison is false, the condition has failed, as indicated at step 1714.

Figure 18:
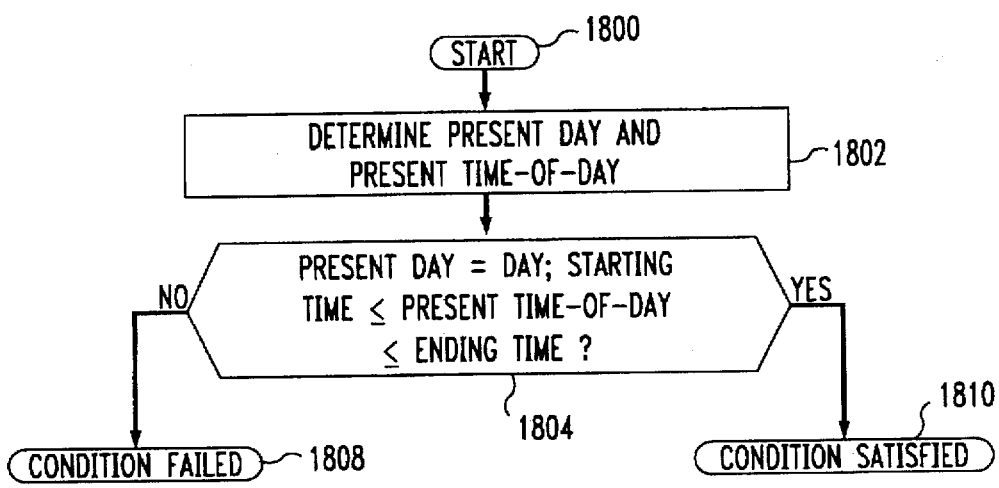

"If TOD is (day)__(start time)__to (end time)__" condition of FIG. 18 tests if it is a particular time on a particular day (e.g., time for the agent's break on the agent's workday). The condition parameters are: the day, the starting time, and the ending time. Upon encountering this condition in a vector command, at step 1800, ACD system 101 determines the present day and time-of-day, at step 1802, and determines therefrom if the present day matches the day specified by the "(day)__" parameter and also if the present time-of-day falls within the time range specified by the "(start time)__" and "(end time)__" parameters, at step 1804. If so, the condition has been satisfied, as indicated at step 1806; if not, the condition has failed, as indicated at step 1808.

Figure 19:
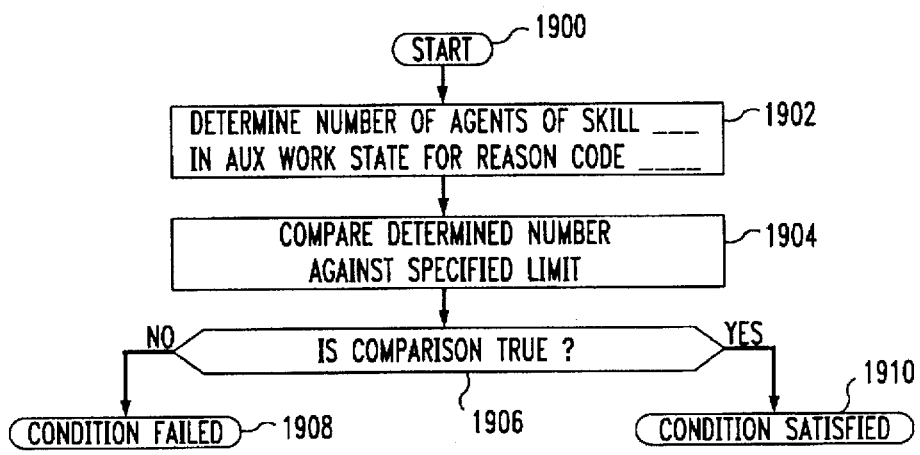
Figure 20:
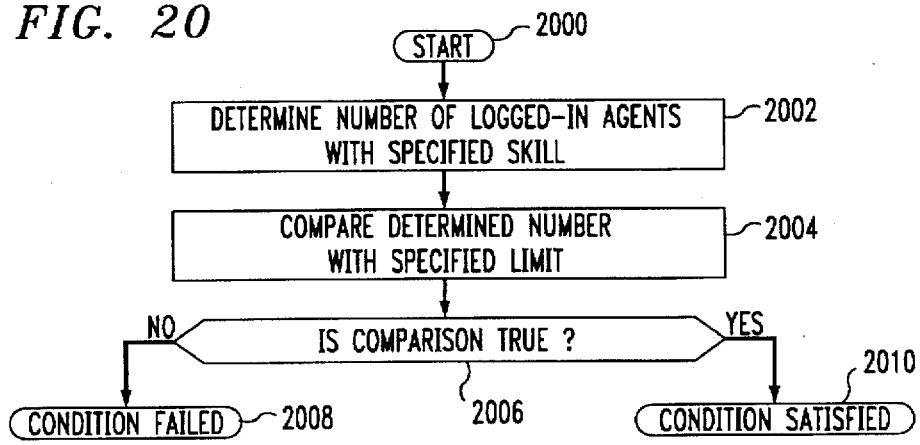

"If agents in AUX reason code__skill__(comp)__" condition of FIG. 19 tests if the number of agents having a specified skill and who are in the AUX work state for a specified reason meet a specified limit. The condition parameters are: a reason code; a skill number; a comparator (comp); and a number limit. Upon encountering this condition in a vector command, at step 1900, system 101 obtains from CMS 110 the number of agents who have the specified skill, whose present work state is AUX, and whose reason code is the specified reason code, at step 1902. System 101 then compares the obtained number against the specified limit by using the specified comparator, at step 1904. If the comparison is true, as determined at step 1906, the condition has been satisfied, as indicated at step 1910; if the comparison is false, the condition has failed, as indicated at step 1908.

"If agents staffed skill__(comp)__" condition of FIG. 12 tests if the number of logged-in agents having a specified skill meets a specified limit. The condition's parameters are: a skill number; a comparator (comp); and a number limit. Upon encountering this condition in a vector command, at step 2000, system 101 obtains from CMS 110 the number of agents who are presently logged in with the specified skill, at step 2002, and compares the obtained number against the specified limit by using the specified comparator, at step 2004. If the comparison is true, as determined at step 2006, the condition has been satisfied, as indicated at step 2010; if the comparison is false, the condition has failed, as indicated at step 2008.

Figure 21:
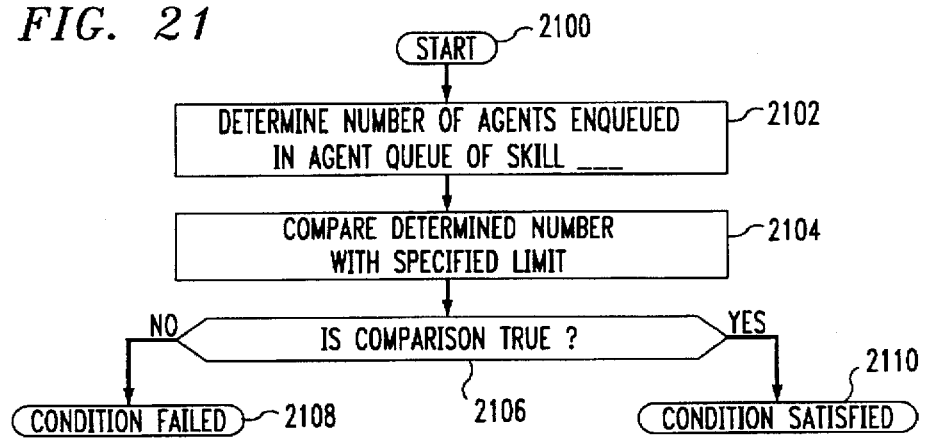

"If agents available in skill__(comp)__" condition of FIG. 21 tests if the number of presently-free and available agents having a specified skill meets a specified limit. The condition's parameters are: a skill number; a comparator (comp); and a number limit. Upon encountering this condition in a vector command, at step 2100, system 101 determines the number of agents who are presently enqueued in the agent queue that corresponds to the specified skill, at step 2102, and compares the determined number against the specified limit by using the specified comparator, at step 2104. If the comparison is true, as determined at step 2106, the condition has been satisfied, as indicated at step 2110; if the comparison is false, the condition has failed, as indicated at step 2108.

Figure 22:
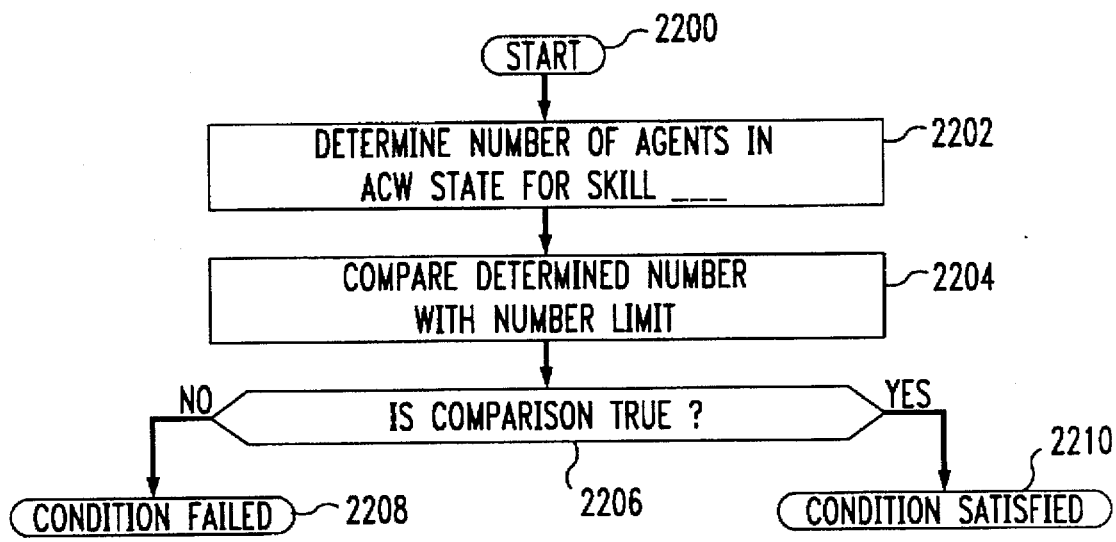

"If agents in ACW skill__(comp)__" condition of FIG. 22 tests if the number of agents who are enqueued in the after-call work of a specified skill meet a specified limit. The condition's parameters are: a skill number; a comparator (comp); and a number limit. Upon encountering this condition in a vector command, at step 2200, system 101 obtains from CMS 110 the number of agents who are in the ACW state for the specified skill, at step 2202, and compares this number against the specified limit by using the specified comparator, at step 2204. If the comparison is true, as determined at step 2206, the condition has been satisfied, as indicated at step 2210; if the comparison is false, the condition has failed, as indicated at step 2208.

Figure 23:
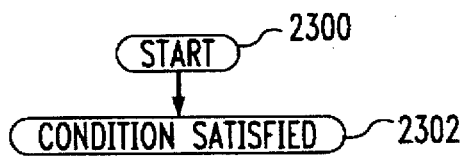

"Unconditional" condition of FIG. 23 always results in performance of the corresponding command, i.e., the condition is always satisfied. There are no parameters. Upon encountering this condition in a vector command, at step 2300, system 101 treat the condition as having been satisfied, as indicated at step 2302.

Figure 24:
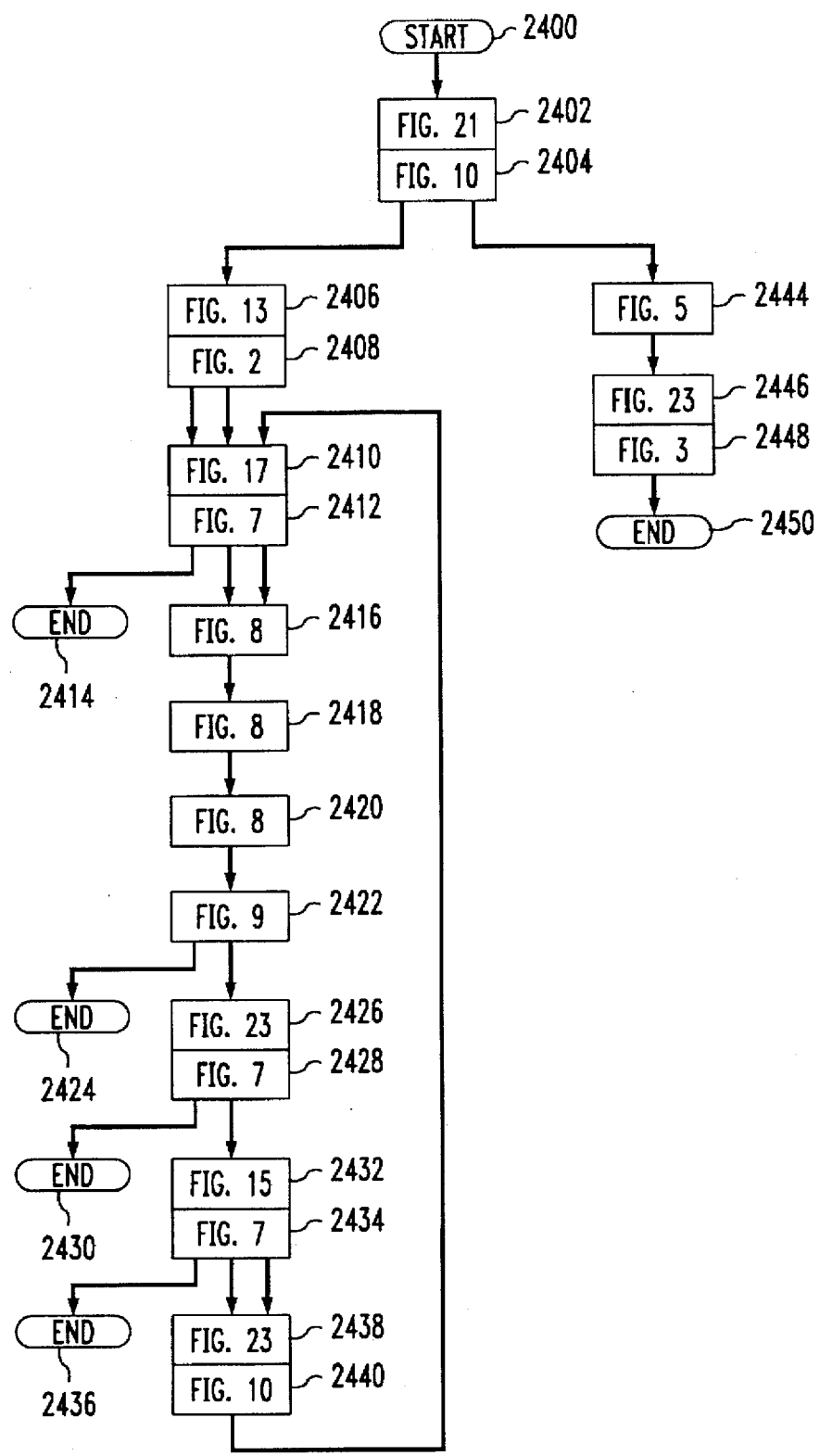
FIG. 24 is a functional flow diagram of an implementation of an illustrative agent vector of the ACD system of the call center of FIG. 1.

FIG. 24 shows an illustrative practical agent vector that might be composed by using the above-described script. The steps of the vector are as shown below. The parentheticals indicate the corresponding steps of FIG. 24.

(2400)
1. Goto step 11 if agents available in skill 9>5. (2402, 2404)
2. Wait 10 seconds hearing silence in ACW if new call skill 9 pri low ewt <20. (2406, 2408)
3. Take call from skill 9 expert level 2 if my % talk time for this skill <30%. (2410, 2412, 2414)
4. Consider skill 1 expert level 6 if my % talk time for this skill <20%. (2416)
5. Consider skill 2 expert level 8 if my % talk time for this skill <20%. (2418)
6. Consider skill 3 expert level 4 if my % talk time for this skill <20%. (2420)
7. Take call from all considered. (2422, 2424)
8. Take call from skill 8 if unconditional. (2426, 2428, 2430)
9. Take call from skill 7 if calls queued skill 7 primed >3. (2432, 2434, 2436)
10. Goto step 3 if unconditional. (2438, 2440)
11. Announcement extension 8223. (2444)
12. Wait 999 seconds hearing silence in AUX reason code 6 if unconditional. (2446, 2448, 2450)

The reason code 6 in step 12 illustratively represents "mail outs", in which case the announcement in step 11 is "Do mail outs".

Of course, various changes and modifications to the illustrative embodiment described above will be apparent to those skilled in the art. For example, additional commands and conditions may be specified, such as ones that take account of special days, e.g., mother's day, Chinese new year, Christmas, etc. Also, the vectors need not execute on the ACD system itself, but rather may execute on an adjunct processor. Furthermore, use of the agent vectors is not limited for voice-call ACD systems, but rather they may be employed to deliver any type of communications, e.g., multimedia calls, Internet calls and messages, e-mail, etc. Such changes and modifications can be made without departing from the spirit and the scope of the invention and without diminishing its attendant advantages. It is therefore intended that such changes and modifications be covered by the following claims.

The invention claimed is:

1. An ACD system for distributing calls for handling to available ones of a plurality of agents in a call center, comprising:

programmable means for specifying, under programming control of an operator of the call center, any one of a plurality of conditions other than an agent refusing a call that is selected by the operator;

means responsive to the agent becoming available to handle a call while a call is waiting to be handled by an available said agent, for determining whether a present state of the call center satisfies the condition specified by the programmable means; and means responsive irrespectively of whether or not another agent is available to handle the waiting call to a determination that the condition is one of (a) satisfied and (b) not satisfied by the present state, for causing the available agent to handle the waiting call, and responsive irrespectively of whether or not another agent is available to handle the waiting call to a determination that the condition is another of (a) satisfied and (b) not satisfied by the present state, for causing the available agent to perform a function other than handling the waiting call.

2. The system of claim 1 wherein:

the programmable means further specify, under programming control of the operator, the function other than handling the waiting call.

3. The system of claim 1 wherein:

the programmable means comprise means for storing, under control of the operator, a vector specifying the one condition and further specifying one of a plurality of alternative functions that is selected by the operator; and the causing means comprise means responsive to a determination that the condition is another of (a) satisfied and (b) not satisfied by the present state, for causing the available agent to perform the alternative function specified by the vector.

4. The system of claim 1 wherein:

the causing means comprise means responsive to a determination that the condition is another of (a) satisfied and (b) not satisfied by the present state, for causing the available agent to take a breather from handling calls.

5. The system of claim 1 wherein:

the programmable means comprise a plurality of programmable means each corresponding to a different agent and specifying any one of the plurality of conditions that is selected for the corresponding agent by the operator; and the determining means comprise means responsive to an agent becoming available, for determining whether the present state satisfies the condition specified by the programmable means that correspond to the agent who has become available.

6. The system of claim 3 wherein:

the stored vector comprises a plurality of steps each specifying a different condition, an alternative function to be performed by the agent if the condition is met, and either a different one of the steps or an exiting of the vector to be performed if the condition is not met;

the determining means comprise vector-step executing means for executing the steps of the stored vector beginning with a first step in response to the agent becoming available, responsive to the present state satisfying the condition specified by a presently-executing step by indicating to the causing means that the condition is satisfied, responsive to the present state not satisfying the condition specified by the presently-executing step and the presently-executing step specifying a different one of the steps by executing the different one of the steps, and responsive to the present state not satisfying the condition specified by the presently-executing step and the presently-executing step specifying an exiting of the vector by indicating to the causing means that the condition is not satisfied; and the causing means comprise means responsive to an indication that the condition is satisfied for causing the available agent to perform the alternative function specified by the vector step whose condition is indicated to have been satisfied, and responsive to an indication that the condition is not satisfied for causing the available agent to handle the waiting call.

7. The system of claim 1 further comprising a plurality of call queues each corresponding to a different one of a plurality of skills and for enqueuing waiting calls that need the corresponding skill for their handling; wherein the determining means comprise means responsive to an agent who has at least one of the skills becoming available to handle a call while a waiting call is enqueued in at least one call queue that corresponds to a skill of the agent, for determining whether a present state of the agent or of the call queues that correspond to the at least one skill of the agent satisfies the condition specified by the programmable means.

8. The system of claim 7 wherein:

the determining means determine whether a call waiting time in the queue in which the waiting call is enqueued exceeds a predetermined threshold.

9. The system of claim 7 wherein:

the determining means determines whether handling of calls from the queue in which the waiting call is enqueued exceeds a predetermined percentage of a workload of the available agent.

10. An ACD system for distributing calls for handling to available ones of a plurality of agents of a call center that has a plurality of call queues each corresponding to a different one of a plurality of agent skills for queuing waiting calls that need an agent having the corresponding skill for their handling, comprising:

programmable means for storing, under programming control of an operator of the call center, a plurality of agent vectors each corresponding to a different agent and each specifying one of a plurality of conditions other than the corresponding agent refusing a call that is selected by the operator and one of a plurality of alternative functions that is selected by the operator;

means responsive to an agent having at least one of the skills becoming available to handle a call while a waiting call is enqueued in at least one queue corresponding to the at least one skill of the agent, for determining whether a present state of the call center satisfies the condition specified by the agent vector that corresponds to the available agent; and means responsive irrespectively of whether or not another agent is available to handle the waiting call to a determination that the condition is not satisfied, for causing the available agent to handle the waiting call, and responsive irrespectively of whether or not another agent is available to handle the waiting call to a determination that the condition is satisfied, for causing the available agent to perform the alternative function specified by the agent vector that corresponds to the available agent instead of handling the waiting call.

11. The system of claim 10 wherein:

the condition specified by the vector corresponding to the available agent is a threshold for a waiting time of a call in a queue; and the determining means determine whether a present waiting time of a call in the queue in which the waiting call is enqueued is exceeded by the threshold.

12. The system of claim 10 wherein:

the condition specified by the vector corresponding to the available agent is a threshold for a percentage of a workload of the corresponding agent; and the determining means determine whether handling of calls from the queue in which the waiting call is enqueued presently exceeds the threshold percentage of the workload of the available agent.

13. The system of claim 10 wherein:

the alternative function specified by the vector corresponding to the available agent is handling of a call from a predetermined call queue.

14. The system of claim 10 wherein:

the alternative function specified by the vector corresponding to the available agent is a function other than handling of a call.

15. A method of automatically assigning work to individual ones of a plurality of agents of a call center, comprising the steps of:

an operator of the call center programmably specifying any one of a plurality of conditions other than an agent refusing a call that is selected by the operator;

in response to the agent becoming available to handle a call while a call is waiting to be handled by an available said agent, determining whether a present state of the call center satisfies the condition specified by the operator;

in response to a determination that the condition is one of (a) satisfied and (b) not satisfied by the present state, causing the available agent to handle the waiting call irrespectively of whether or not another agent is available to handle the waiting call; and in response to a determination that the condition is another of (a) satisfied and (b) not satisfied by the present state, causing the available agent to perform a function other than handling the waiting call irrespectively of whether or not another agent is available to handle the waiting call.

16. A computer-usable program storage device having embodied therein means for automatically assigning work to individual ones of a plurality of agents of a call center, said means being computer-readable program code means for causing the computer to perform the functions of:

enabling an operator of the call center to programmably specify to the computer any one of a plurality of conditions other than an agent refusing a call that is selected by the operator;

in response to the agent of the call center becoming available to handle a call while a call is waiting to be handled by an available said agent, determining whether a present state of the call center satisfies the condition specified by the operator;

in response to a determination that the condition is one of (a) satisfied and (b) not satisfied by the present state, causing the available agent to handle the waiting call irrespectively of whether or not another agent is available to handle the waiting call; and in response to a determination that the condition is another of (a) satisfied and (b) not satisfied by the present state, causing the available agent to perform a function other than handling the waiting call irrespectively of whether or not another agent is available to handle the waiting call.

* * * * *